(12) United States Patent
Boland et al.

(10) Patent No.: US 10,095,243 B2
(45) Date of Patent: Oct. 9, 2018

(54) SYSTEM AND METHOD TO OPERATE A DRONE

(71) Applicant: International Business Machines Corporation, Armonk, NY (US)

(72) Inventors: Gregory F. Boland, Katonah, NY (US); James R. Kozloski, New Fairfield, CT (US); Yu Ma, White Plains, NY (US); Justin G. Manweiler, Somers, NY (US); Kevin E. Siemonsen, New Fairfield, CT (US); Umut Topkara, White Plains, NY (US); Katherine Vogt, New York, NY (US); Justin D. Weisz, Stamford, CT (US)

(73) Assignee: International Business Machines Corporation, Armonk, NY (US)

( * ) Notice: Subject to any disclaimer, the term of this patent is extended or adjusted under 35 U.S.C. 154(b) by 262 days.

(21) Appl. No.: 15/232,366

(22) Filed: Aug. 9, 2016

(65) Prior Publication Data

US 2017/0160752 A1 Jun. 8, 2017

Related U.S. Application Data

(63) Continuation of application No. 14/962,147, filed on Dec. 8, 2015, now Pat. No. 9,471,064.

(51) Int. Cl.
*G05D 1/10* (2006.01)
*B64C 39/02* (2006.01)
(Continued)

(52) U.S. Cl.
CPC .......... *G05D 1/104* (2013.01); *B64C 39/024* (2013.01); *G05D 1/0011* (2013.01);
(Continued)

(58) Field of Classification Search
USPC .......................................................... 701/3
See application file for complete search history.

(56) References Cited

U.S. PATENT DOCUMENTS

| | | | | |
|---|---|---|---|---|
| 7,398,209 B2* | 7/2008 | Kennewick | ............. | G10L 15/22 704/255 |
| 7,620,549 B2* | 11/2009 | Di Cristo | ............. | G06F 17/273 704/251 |

(Continued)

FOREIGN PATENT DOCUMENTS

JP    2005269413 A    *    9/2005

OTHER PUBLICATIONS

Nehme et al., "Generating Requirements for Futuristic Hetrogenous Unmanned Systems." Proceedings of the Human Factors and Ergonomics Society Annual Meeting. vol. 50. No. 3. SAGE Publications, 2006, pp. 1-5.

(Continued)

*Primary Examiner* — Shelly Chen
(74) *Attorney, Agent, or Firm* — Scully, Scott, Murphy & Presser, PC; Daniel P. Morris

(57) ABSTRACT

A method for controlling a drone includes receiving a natural language request for information about a spatial location, parsing the natural language request into data requests, configuring a flight plan and controlling one or more drones to fly over the spatial location to obtain data types based on the data requests, and extracting and analyzing data to answer the request. The method can include extracting data points from the data types, obtaining labels from a user for one or more of the data points, predicting labels for unlabeled data points from a learning algorithm using the labels obtained from the user, determining the predicted labels are true labels for the unlabeled data points and combining the extracted data, the user labeled data points and the true labeled data points to answer the request (Continued)

for information. The learning algorithm may be active learning using a support vector machine.

20 Claims, 7 Drawing Sheets

(51) Int. Cl.
  *G05D 1/00* (2006.01)
  *G08G 5/00* (2006.01)
  *G06F 17/27* (2006.01)
  *G06N 7/00* (2006.01)
  *G06N 99/00* (2010.01)
(52) U.S. Cl.
  CPC ......... *G05D 1/0016* (2013.01); *G05D 1/0088* (2013.01); *G06F 17/2705* (2013.01); *G06N 7/005* (2013.01); *G06N 99/005* (2013.01); *G08G 5/0034* (2013.01); *G08G 5/0069* (2013.01); *B64C 2201/145* (2013.01)

(56) References Cited

U.S. PATENT DOCUMENTS

| | | | | |
|---|---|---|---|---|
| 7,640,160 | B2* | 12/2009 | Di Cristo | G06F 17/279 704/251 |
| 2004/0061641 | A1* | 4/2004 | Fischer | F41G 5/08 342/96 |
| 2005/0197749 | A1* | 9/2005 | Nichols | G05D 1/0202 701/3 |
| 2008/0215204 | A1* | 9/2008 | Roy | G05D 1/0044 701/28 |
| 2010/0250022 | A1* | 9/2010 | Hines | G05D 1/0094 701/2 |
| 2010/0302359 | A1* | 12/2010 | Adams | B64C 39/024 348/117 |
| 2013/0132434 | A1* | 5/2013 | Scofield | G08G 1/0112 707/771 |
| 2013/0173321 | A1* | 7/2013 | Johnson | G06Q 10/06 705/7.12 |
| 2014/0018979 | A1* | 1/2014 | Goossen | G08G 5/0034 701/3 |
| 2014/0032020 | A1* | 1/2014 | Guyette | G01S 19/54 701/3 |
| 2014/0035752 | A1* | 2/2014 | Johnson | A01B 79/005 340/601 |
| 2014/0142785 | A1* | 5/2014 | Fuentes | G05D 1/0011 701/2 |
| 2014/0316616 | A1* | 10/2014 | Kugelmass | G05D 1/101 701/8 |
| 2014/0344118 | A1* | 11/2014 | Parpia | G06Q 10/087 705/28 |
| 2015/0168144 | A1* | 6/2015 | Barton | G01C 11/02 348/144 |
| 2015/0204974 | A1* | 7/2015 | Pillay | G01S 13/90 342/25 A |
| 2015/0336669 | A1* | 11/2015 | Kantor | G01C 21/3415 701/3 |
| 2015/0339912 | A1* | 11/2015 | Farrand | G08B 25/00 340/501 |
| 2015/0350614 | A1* | 12/2015 | Meier | H04N 7/185 348/144 |

OTHER PUBLICATIONS

Hieb et al., "Geospatial challenges in a net centric environment: actionable information technology, design, and implementation." Defense and Security Symposium. International Society for Optics and Photonics, 2007, pp. 1-12.
Kliment et al., "Supporting a Regional Agricultural Sector with Geo & Mainstream ICT—the Case Study of Space4Agri Project." AGRIS on-line Papers in Economics and Informatics 6.4 (2014), pp. 69-80.
Pourreza et al., "An optimum method for real-time in-field detection of Huanglongbing disease using a vision sensor." Computers and Electronics in Agriculture 110 (2015); pp. 221-232.
Wikle, Christopher K., and Christopher J. Anderson. "Statistics,"Big Data", and Agricultural Forecasting." Statistics Views (2015), pp. 1-8; http://www.statisticsviews.com/details/feature/8046071/Statistics-Big-Da . . . .
Troyano, Filtering Scholarly Writing From the Open Web using Active Learning SVS, Press Forward, Apr. 2, 2013, pp. 1-13, http://pressforward.org.
Authors Anonymous, "A Method and System for Managing a Fleet of Drones", ip.com, Oct. 22, 2015, pp. 1-3.
List of IBM Patents or Patent Applications Treated as Related dated Aug. 9, 2016, pp. 2.
Office Action dated Apr. 4, 2016 from related U.S. Appl. No. 14/962,147.
Notice of Allowance dated Jul. 7, 2016 from related U.S. Appl. No. 14/962,147.

* cited by examiner

SYSTEM AND METHOD TO OPERATE A DRONE

BACKGROUND OF THE INVENTION

This disclosure relates generally to operating one or more drones and more particularly to controlling one or more drones to respond to a request for information.

Drones are small, lightweight aerial vehicles that are operated either autonomously by onboard computers or by a human operator via remote control. For autonomous flight, drones contain a GPS device that guides them along a sequence of waypoints and enables them to return to their launching point. Drones may carry small payloads, such as sensor packages, cameras, or other types of small objects. The flight time of a drone is a function of its weight, battery capacity, and operating environment, such as wind. Flight times generally range from 10-15 minutes per battery for helicopter drones and 30-50 minutes for fixed-wing drones.

Drones are becoming increasingly popular in the hobbyist/consumer market. Interest in the commercial use of drones is also increasing, as new regulations in the U.S. are being crafted to enable commercial drone flights. Industries that drones will impact include agriculture, cinematography, mining, oil & gas, emergency response, and law enforcement. These industries will need to control drones to respond to requests for information.

SUMMARY OF THE INVENTION

In one embodiment a method for controlling one or more drones to respond to a request for information is disclosed, that includes receiving a natural language request for information about a spatial location, parsing the natural language request into a plurality of data requests, configuring a flight plan for one or more drones over the spatial location based on the plurality of data requests, controlling one or more drones to fly over the spatial location according to the configured flight plan to obtain a plurality of data types from the spatial location based on the plurality of data requests, extracting data responsive to the plurality of data requests from the plurality of data types obtained by the one or more drones and analyzing the responsive data to provide an answer to the natural language request for information.

In one embodiment, the data types include one or more of data obtained from an imaging system and data obtained from one or more sensors. In one embodiment, configuring a flight plan for one or more drones includes selecting one or more drones based on matching drone capabilities to one or more of the plurality of data requests. In another embodiment, controlling the one or more drones includes one or more of uploading flight plans to the one or more drones, receiving real-time telemetry from the drone, performing analytics on the real-time telemetry to determine real-time flight conditions and displaying the real-time telemetry and real-time flight conditions on a user interface (UI) in a mobile application. One embodiment includes manually controlling the flight path of the one or more drones from the UI. In one embodiment, the method includes storing the plurality of data types obtained by the one or more drones and creating location and time indices for recall of the plurality of data types.

In another embodiment, the method for controlling one or more drones to respond to a request for information includes receiving a first natural language request for information about a spatial location, parsing the first natural language request into a plurality of data requests, searching for existing sources for the plurality of data requests, determining that there are one or more existing sources for one or more of the plurality of data requests, analyzing the existing sources to obtain first data responsive to the plurality of data requests, determining that there are no existing sources for two or more of the plurality of data requests and identifying the data requests with no existing source as missing data requests. The method includes configuring a flight plan for one or more drones over spatial location based on the missing data requests, controlling the one or more drones to fly over the spatial location according to the configured flight plan to obtain a plurality of data types from the spatial location based on the missing data requests and extracting a plurality of data points responsive to the plurality of data requests from the plurality of data types obtained by the one or more drones. The method also includes obtaining labels from a user for one or more of the plurality of data points, determining whether there are unlabeled data points, predicting labels the for the unlabeled data points from a learning algorithm using the labels obtained from the user, determining the predicted labels are true labels for the unlabeled data points and combining the first data, the user labeled data points and the true labeled data points to provide an answer to the first natural language request for information. In one embodiment, the learning algorithm is active learning using a support vector machine.

In another embodiment, the method further includes receiving a second natural language request for information about the spatial location, parsing the second natural language request into a plurality of second data requests, searching for existing sources for the plurality of second data requests, determining that there are one or more existing sources for one or more of the plurality of second data requests, analyzing the existing sources to obtain second data responsive to the plurality of second data requests, determining that there are no existing sources for two or more of the plurality of second data requests and identifying the data requests with no existing source as missing data requests. The method also includes configuring a flight plan for one or more drones over the spatial location based on the missing data requests, controlling the one or more drones to fly over the spatial location according to the configured flight plan to obtain a plurality of data types from the spatial location based on the missing data requests, extracting a plurality of data points responsive to the plurality of data requests from the plurality of data types obtained by the one or more drones. The method further includes determining that there are user labels and predicted true labels for all the plurality of data points and combining the second data, the user labeled data points and the predicted true labeled data points to provide an answer to the second natural language request for information.

In one embodiment a non-transitory article of manufacture tangibly embodying computer readable instructions, which when implemented, cause a computer to perform the steps of a method for controlling one or more drones to respond to a request for information, is disclosed that includes receiving a natural language request for information about a spatial location, parsing the natural language request into a plurality of data requests, configuring a flight plan for one or more drones over the spatial location based on the plurality of data requests, controlling one or more drones to fly over the spatial location according to the configured flight plan to obtain a plurality of data types from the spatial location based on the plurality of data requests, extracting data responsive to the plurality of data requests from the plurality of data types obtained by the one or more drones and analyzing the responsive data to provide an answer to the natural language request for information.

In another embodiment, the non-transitory article of manufacture includes computer readable instructions, which when implemented, cause a computer to perform the steps of searching for existing sources for the plurality of data requests, determining that there are one or more existing sources for one or more of the plurality of data requests, analyzing the existing sources to obtain first data responsive to the plurality of data requests, determining that there are no existing sources for two or more of the plurality of data requests and identifying the data requests with no existing source as missing data requests. The computer readable instructions include configuring a flight plan for one or more drones over the spatial location based on the missing data requests, controlling one or more drones to fly over the spatial location according to the configured flight plan to obtain a plurality of data types from the spatial location based on the missing data requests, extracting a plurality of data points responsive to the plurality of data requests from the plurality of data types obtained by the one or more drones, obtaining labels from a user for one or more of the plurality of data points, determining whether there are unlabeled data points and predicting labels for the unlabeled data points from a learning algorithm using the labels obtained from the user. The learning algorithm may be in one embodiment active learning using a support vector machine. The computer readable instructions include determining the predicted labels are true labels for the unlabeled data points and combining the first data, the user labeled data points and the true labeled data points to provide an answer to the first natural language request for information.

In one embodiment a computer system for controlling one or more drones to respond to a request for information is disclosed that includes one or more computer processors, one or more non-transitory computer-readable storage media, program instructions, stored on the one or more non-transitory computer-readable storage media, which when implemented by the one or more processors, cause the computer system to perform the steps of receiving a natural language request for information about a spatial location, parsing the natural language request into a plurality of data requests, configuring a flight plan for one or more drones over the spatial location based on the plurality of data requests, controlling one or more drones to fly over the spatial location according to the configured flight plan to obtain a plurality of data types from the spatial location based on the plurality of data requests, extracting data responsive to the plurality of data requests from the plurality of data types obtained by the one or more drones and analyzing the responsive data to provide an answer to the natural language request for information.

In another embodiment, the computer system also includes program instructions which cause the computer system to perform the steps of searching for existing sources for the plurality of data requests, determining that there are one or more existing sources for one or more of the plurality of data requests, analyzing the existing sources to obtain first data responsive to the plurality of data requests, determining that there are no existing sources for two or more of the plurality of data requests and identifying the data requests with no existing source as missing data requests. The program instructions include configuring a flight plan for one or more drones over the spatial location based on the missing data requests, controlling one or more drones to fly over the spatial location according to the configured flight plan to obtain a plurality of data types from the spatial location based on the missing data requests, extracting a plurality of data points responsive to the plurality of data requests from the plurality of data types obtained by the one or more drones, obtaining labels from a user for one or more of the plurality of data points, determining whether there are unlabeled data points, predicting labels for the unlabeled data points from a learning algorithm using the labels obtained from the user, determining the predicted labels are true labels for the unlabeled data points and combining the first data, the user labeled data points and the true labeled data points to provide an answer to the first natural language request for information.

BRIEF DESCRIPTION OF THE DRAWINGS

These and other objects, features and advantages of the present invention will become apparent from the following detailed description of illustrative embodiments thereof, which is to be read in connection with the accompanying drawings, in which.

DETAILED DESCRIPTION OF PREFERRED EMBODIMENTS

Figure 1:
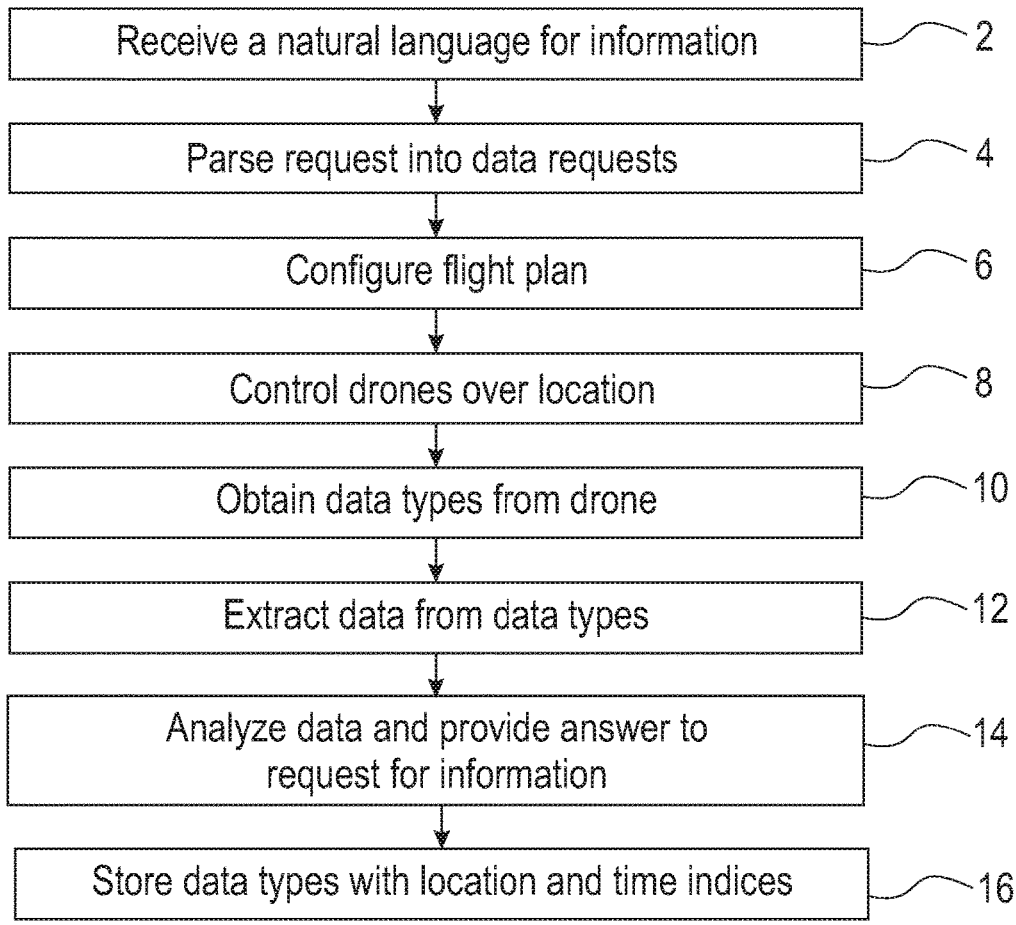
FIG. 1 is flow chart of one embodiment of a method for controlling one or more drones to respond to a request for information.

FIG. 1 is a flow chart of one embodiment of a method for controlling one or more drones to respond to a request for information. The method includes at step 2 receiving a natural language request for information about a spatial location. Step 4 is parsing the natural language request into a plurality of data requests. One embodiment of the invention includes a method for making drone requests by using techniques from natural language processing to infer structured data from an unstructured specification. The data requests parsed from the natural language request can include a set of data to be collected, a location from which that data is collected, a pipeline of analytics to be performed on that data, and a timeframe to collect the data. For example, one natural language request from a farmer may be "is there frost on the south field today?" which may be combined with prior knowledge (e.g. the definition of "south field") and domain-specific vocabulary (e.g. "frost"), to translate this into a request. The request is parsed into include: location: south field, data: imagery, analytic: frost detection, when: today. In this way, the method maps from the topic space of natural-language questions a requester might ask into the measurement space of the data the drone can collect and analytics it can perform. In one embodiment, the natural language request is parsed to specify a set of data to collect (e.g. images, video, temperature) within a specified geographic region (e.g. identified by GPS coordinates) by a certain time frame (e.g. by next week) with certain analytics performed on the data (e.g. frost detection).

Step 6 is configuring a flight plan for one or more drones over the spatial location based on the plurality of data requests. In one embodiment, terrain-aware, drone-aware and/or weather-aware flight plans are generated. This embodiment uses algorithms/heuristics that incorporate awareness of ground terrain, energy costs of various flight operations (increase/decrease ground elevation, change in direction, etc.), and current weather/wind conditions to generate optimal or near-optimal flight plans with 100% ground coverage. The idea is to maximize battery life by creating flight plans that take advantage of the underlying terrain model, paying attention to the energy-cost functions for drone flight operations (ascend/descend, heading changes), and current wind conditions. For example, a flight plan over a hill is more efficient when the drone makes one trip up the hill and then descends the hill laterally to achieve full coverage, rather than making multiple trips up and down the hill to achieve coverage. Another example is to tailor the flight path to current wind conditions; e.g. flying into or perpendicular to the direction of the prevailing wind is more efficient than flying against it. These heuristics enable accurate prediction of how long a particular task (e.g., mapping) will actually take the drone operator and required resources (especially, the number of required batteries). Accuracy enables low-risk effective time management. The approach is to create a grid of ground points. The UAV is required to reach (in succession) each of these points, at a specified elevation over the ground. In doing so, the UAV will have covered the specified terrain uniformly and completely (for the purpose of taking photographs, sensor readings, etc.) The invention optimizes the order of each ground point such that the battery cost of the flight is minimized, extending flight times.

Step 8 is controlling one or more drones to fly over the spatial location according to the configured flight plan to obtain a plurality of data types from the spatial location based on the plurality of data requests. Step 10 is extracting data responsive to the plurality of data requests from the plurality of data types obtained by the one or more drones. Step 14 is analyzing the responsive data to provide an answer to the natural language request for information. In one embodiment, the invention uses a series of analytics to clean, process, and analyze data collected by the drone. These analytics may operate in a pipeline fashion, e.g. using a technology such as UIMA, in order to satisfy data dependencies. For example, a sample pipeline for a series of images collected by a drone might include selecting a subset of images based on their clarity (i.e. discard blurry images), stitching the images to form an orthorectified mosaic and overlaying sensor data collected by the drone to create a visual heat map.

Analytics may include tracking the operating characteristics of drones and alerting operators when maintenance may be required. Using statistics on drone usage, such as usage-hours, accelerometer data, and gyroscope data, the user can perform predictive maintenance tasks based on analytics that consider drone failure rates across fleets of drones.

Step 16 is storing the data types with location and time indices. In one embodiment, the data types includes one or more of data obtained from an imaging system and data obtained from one or more sensors on the drones. One embodiment includes storing heterogeneous data captured by the drone and creating spatio-temporal indices so the data can be recalled based on location and time. Spatiotemporal indices help the drone operator identify what spatial or temporal coverage gaps exist in the fulfillment of a request. Once the set of data is complete, the spatial index helps ensure that only data is shared back to the requestor that the requestor should be able to see. For example, a farmer should not see data from an adjacent farm, even if the UAV has incidentally captured data from that farm. The spatial index can identify what data (e.g., video footage or multispectral imagery) applies to a specific field.

Figure 2:
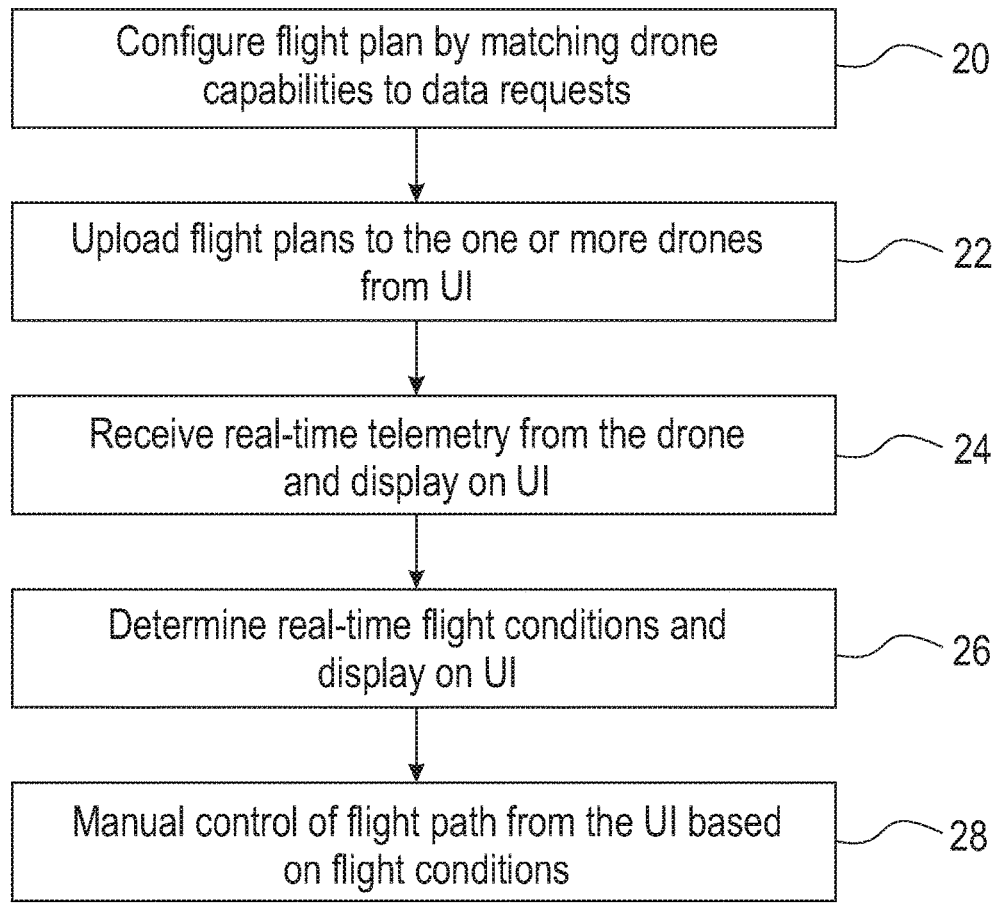
FIG. 2 is flow chart of another embodiment of a method for controlling one or more drones to respond to a request for information.

As shown in FIG. 2, in one embodiment the method may also include step 20 of configuring a flight plan for one or more drones by selecting one or more drones based on matching drone capabilities to one or more of the plurality of data requests. A drone registry can track the hardware capabilities of the drones in the fleet, e.g. drone type (quad, octo, fixed wing), flight time, payload capacity, propeller requirements, as well as the sensor payloads with which they are equipped. For example, drones can have one or more of an optical camera, an IR camera, an NIR camera, a temperature sensor and an optical flow sensor. One example of matching the capabilities of the drone to the data request is matching a drone that contains an NIR camera to a data request of "create an NDVI map of my farm." An example of a request that does not match the requirements is a drone that only contains an optical camera and the request is to map the temperature of this field.

In another embodiment, controlling the one or more drones includes step 22 of uploading flight plans to the one or more drones from a user interface (UI), step 24 of receiving real-time telemetry from the drones and displaying the telemetry on the UI, step 26 of performing analytics on the real-time telemetry to determine real-time flight conditions and displaying the flight conditions on the UI in a mobile application. One embodiment includes step 28 of manually controlling the flight path of the one or more drones from the UI.

In another embodiment, a drone request is generated automatically as part of an active learning system responsible for maintaining a Deep Q&A interface to users. In this embodiment, the Q&A interface allows individuals to formulate natural language questions about the environment in certain spatial locations, including aspects such as local weather, traffic conditions, vegetation properties, structures and their status and persons moving through an environment. The system then performs a search of sensor data to determine if the question can be answered with a sufficient degree of confidence (C) to exceed a threshold (T) and trigger a response. If C<T, a drone active learning component is activated, which automatically configures a drone request to gather additional information for answering the question. Active learning, as is known in the art, typically involves querying expert humans pertaining to questions on a particular subject. The use of drones to gather information for a similar active learning solution is used in this disclosure to construct a Q&A system around environmental and geographical topics.

In this embodiment, the human annotator is a drone, and the labels the drone provides are extracted from observations and data gathered by the drone. In one example, a series of steps implementing this embodiment may include:

Farmer logs into a Deep Q&A interface for his thousand acre farm.

Farmer poses a natural language question: "What is the risk of a viral infection taking hold due to the recent drought in the upper north field of sweet potatoes?"

Deep Q&A system parses this question, and an active learning component is activated by an identified need to survey the crop and assess variance in crop stress observed by leaf desiccation patterns based on an agriculture journal article correlated this variance with viral infection taking hold and spreading from most stressed plants.

Deep Q&A configures a drone to perform a hyperspectral image survey of the field identified.

Drone gathers data from geographical location and relays it back to the active learning component.

Active learning component labels the data by for example measuring mean and variance, for training inclusion in a support vector machine training and categorizes risk of infection.

Active learning is a special case of semi-supervised machine learning in which a learning algorithm is able to interactively query the user (or some other information source) to obtain the desired outputs at new data points. In statistics literature it is sometimes also called optimal experimental design. There are situations in which unlabeled data is abundant but manually labeling is expensive. In such a scenario, learning algorithms can actively query the user/teacher for labels. This type of iterative supervised learning is called active learning. Since the learner chooses the examples, the number of examples to learn a concept can often be much lower than the number required in normal supervised learning. With this approach, there is a risk that the algorithm be overwhelmed by uninformative examples. Recent developments are dedicated to hybrid active learning and active learning in a single-pass (on-line) context, combining concepts from the field of Machine Learning (e.g., conflict and ignorance) with adaptive, incremental learning policies in the field of Online machine learning.

Some active learning algorithms are built upon Support vector machines (SVMs) and exploit the structure of the SVM to determine which data points to label. Such methods usually calculate the margin, W, of each unlabeled datum in $T\_\{U,i\}$ and treat W as an n-dimensional distance from that datum to the separating hyperplane.

Minimum Marginal Hyperplane methods assume that the data with the smallest W are those that the SVM is most uncertain about and therefore should be placed in $T\_\{C,i\}$ to be labeled. Other similar methods, such as Maximum Marginal Hyperplane, choose data with the largest W. Tradeoff methods choose a mix of the smallest and largest Ws.

In example above of the farmer, the system is seeking to predict variance in drought stress in a crop by learning drone hyperspectral imaging features, collected automatically by drone, and training a support vector machine on these features, given labels derived from another source, fro example, a subsequent assessment by a farmer taking samples in a grid pattern throughout his field\. In active learning, labels are costly to collect, and the goal is to predict labels from less costly measures, in this case from automatic drone based images.

In this embodiment of the invention, the method answers farmer's question and learns the predictors of the labels gathered via the drone for future inference in the absence of drone observation. This embodiment incorporates the learned predictors of the labels that the system has generated from the drone hyperspectral imaging data and the farmer's labels into the Deep Q&A system itself. Once incorporated, whenever a similar query is made, either directly, or indirectly as evidence is gathered for a secondary assessment, about the variance of crop stress due to drought, the drone is automatically deployed and collects data. These data are then automatically assessed by the actively learned classifiers, and the predicted labels are immediately, and cheaply, incorporated into the formulation of an answer to the Deep Q&A query.

Figure 3A:
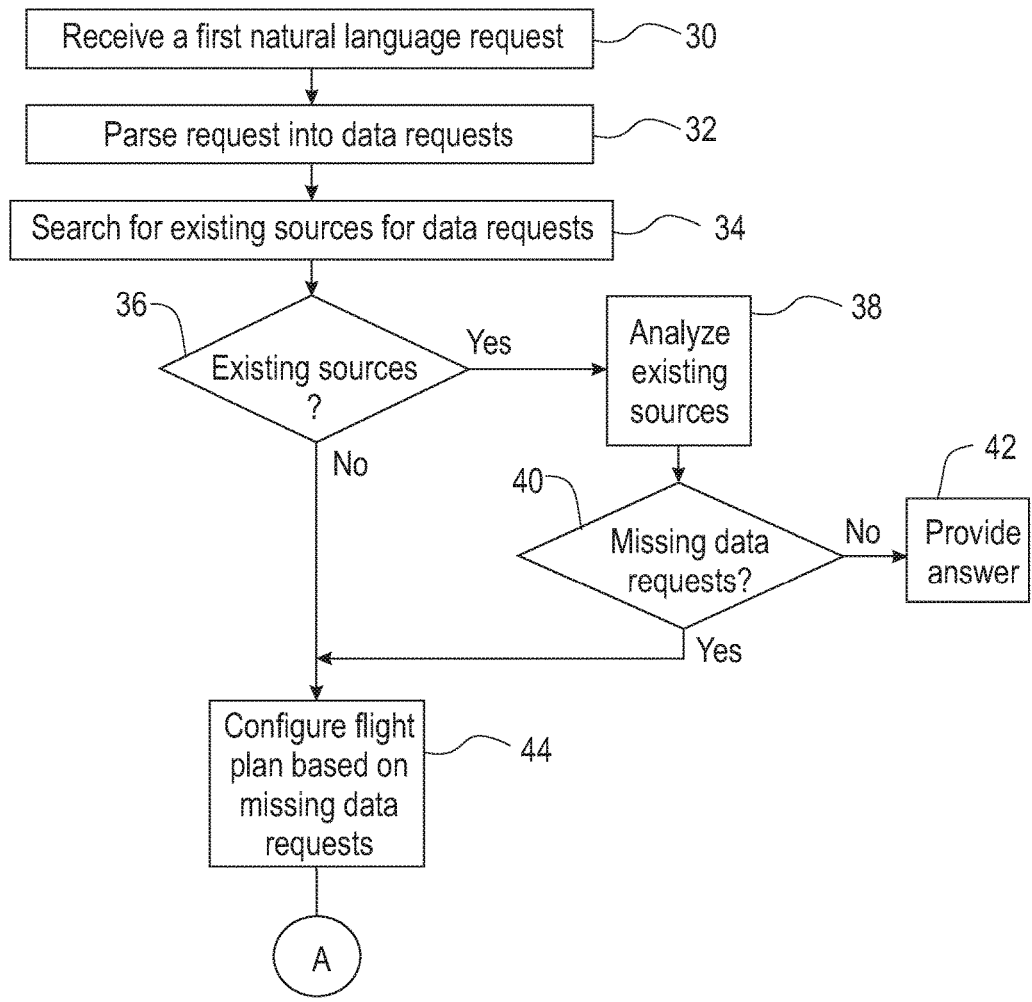
FIG. 3A is a first part of a flow chart of one embodiment a method for controlling one or more drones to respond to a request for information using active learning.
Figure 3B:
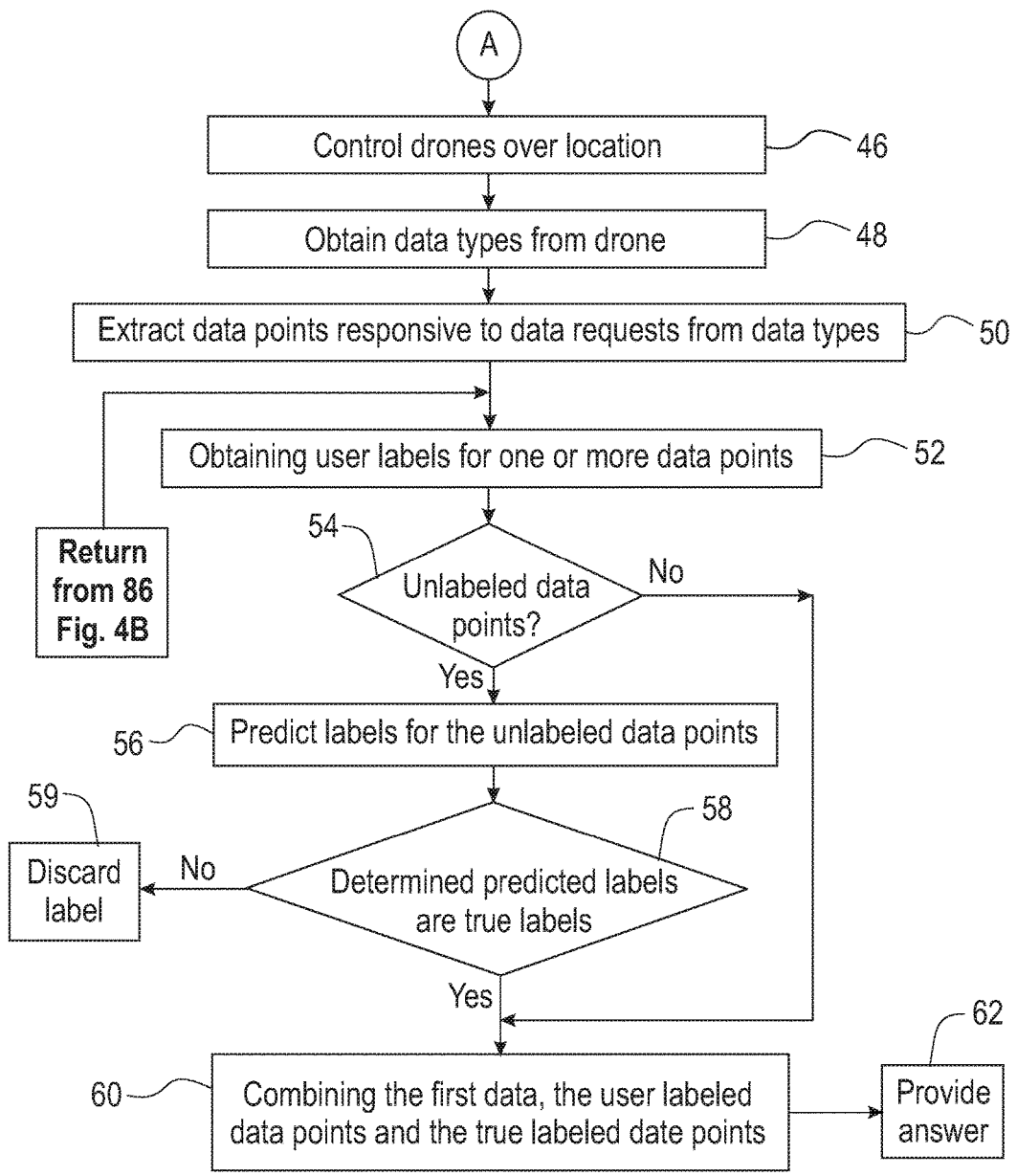
FIG. 3B is a second part of a flow chart of one embodiment a method for controlling one or more drones to respond to a request for information using active learning.

FIGS. 3A and 3B is a flow chart of an embodiment of the method for controlling a drone to respond to a request for information using a learning technique. As shown in FIG. 3A, step 30 is receiving a first natural language request for information about a spatial location. Step 32 is parsing the first natural language request into a plurality of data requests. Step 34 is searching for existing sources for the plurality of data requests. Step 36 is determining whether there are one or more existing sources for one or more of the plurality of data requests. If the result is Yes in step 36, the method moves to step 38. Step 38 is analyzing the existing sources to obtain first data responsive to the plurality of data requests. Step 40 is determining whether there are no existing sources for two or more of the plurality of data requests. If the result is No to step 40 then the system provides an answer to the request for information based on the analysis of the existing sources. If the answer is Yes to step 40 data requests with no existing source are identified as missing data requests. The method then moves to step 44 when the result of step 36 is No or the result of step 40 is Yes. Step 44 is configuring a flight plan for one or more drones over spatial location based on the missing data requests.

As shown in FIG. 3B, step 46 is controlling the one or more drones to fly over the spatial location according to the configured flight plan. Step 48 is obtaining a plurality of data types from the spatial location based on the missing data requests. Step 50 is extracting a plurality of data points responsive to the plurality of data requests from the plurality of data types obtained by the one or more drones. Step 52 is obtaining labels from a user for one or more of the plurality of data points. Step 54 is determining whether there are unlabeled data points. If there are no unlabeled data points the method moves to step 60. If there are unlabelled data points, step 56 is predicting labels for the unlabeled data points from a learning algorithm using the labels obtained from the user. Step 58 is determining whether the predicted labels are true labels for the unlabeled data points. Predicted labels that are determined not to be true labels are discarded in step 59. If predicted labels are determined to be true labels, the method moves to step 60. Step 60 is combining the first data, the user labeled data points and the true labeled data points to provide in step 62 an answer to the first natural language request for information. In one embodiment, the learning algorithm is active learning using a support vector machine.

Figure 4A:
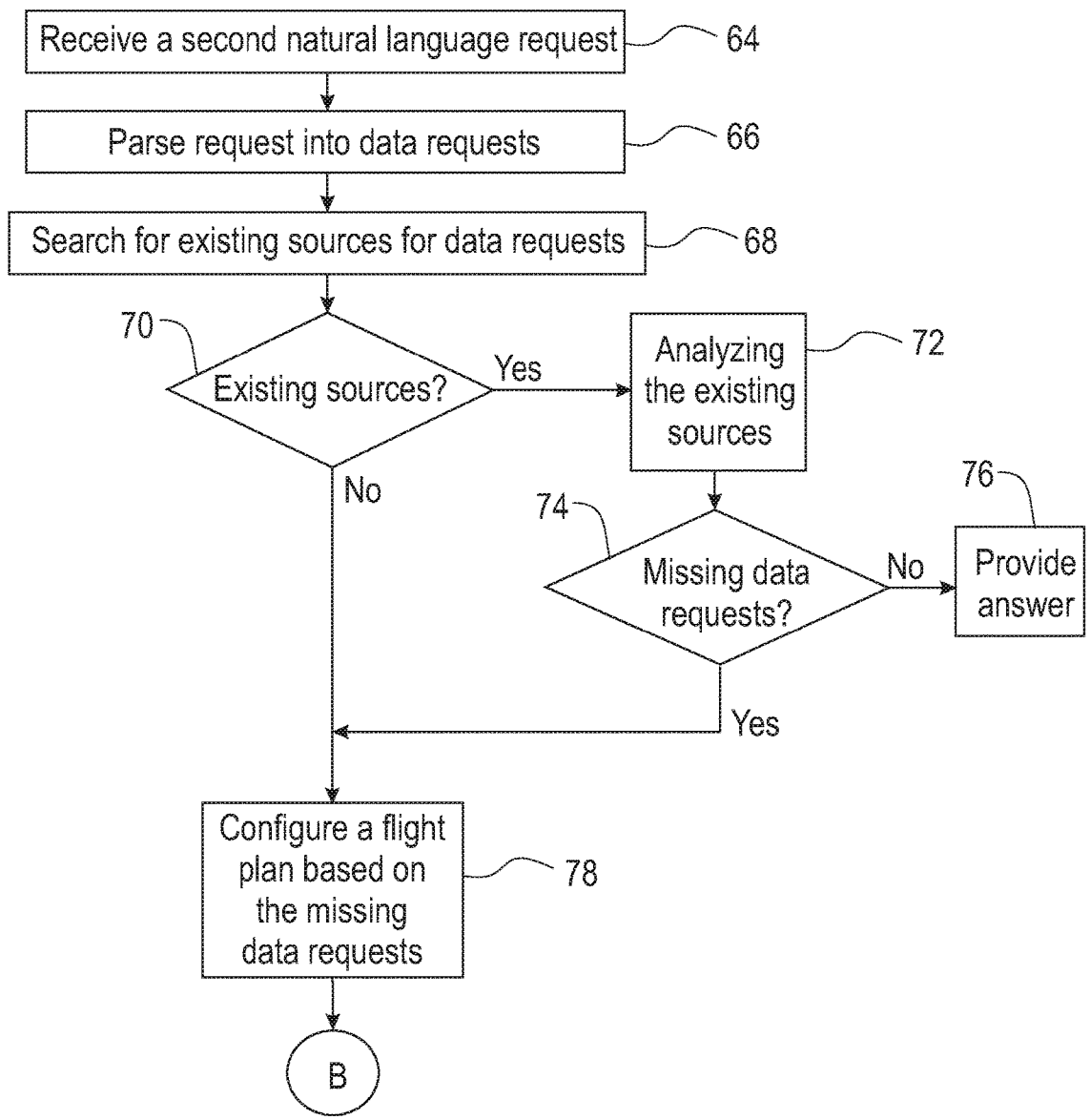
FIG. 4A is a first part of flow chart of another embodiment a method for controlling one or more drones to respond to a request for information using active learning.

As shown in FIG. 4A, in another embodiment, the method further includes at step 64 receiving a second natural language request for information about the spatial location and parsing the second natural language request into a plurality of second data requests at step 66. Step 68 is searching for existing sources for the plurality of second data requests. Step 70 is determining whether there are one or more existing sources for one or more of the plurality of second data requests. If there are no existing sources, the method moves to step 78. If there are existing sources, the method moves to step 72. Step 72 is analyzing the existing sources to obtain second data responsive to the plurality of second data requests. Step 74 is determining whether there are no existing sources for two or more of the plurality of second data requests and identifying the data requests with no existing source as missing data requests. If the are no missing data requests, the method provides an answer based on the analysis of the existing sources at step 76. If there are missing data requests, the method moves to step 78 which is configuring a flight plan for one or more drones over the spatial location based on the missing data requests. Step 80 is controlling the one or more drones to fly over the spatial location according to the configured flight plan to obtain a plurality of data types from the spatial location based on the missing data requests at step 82.

Figure 4B:
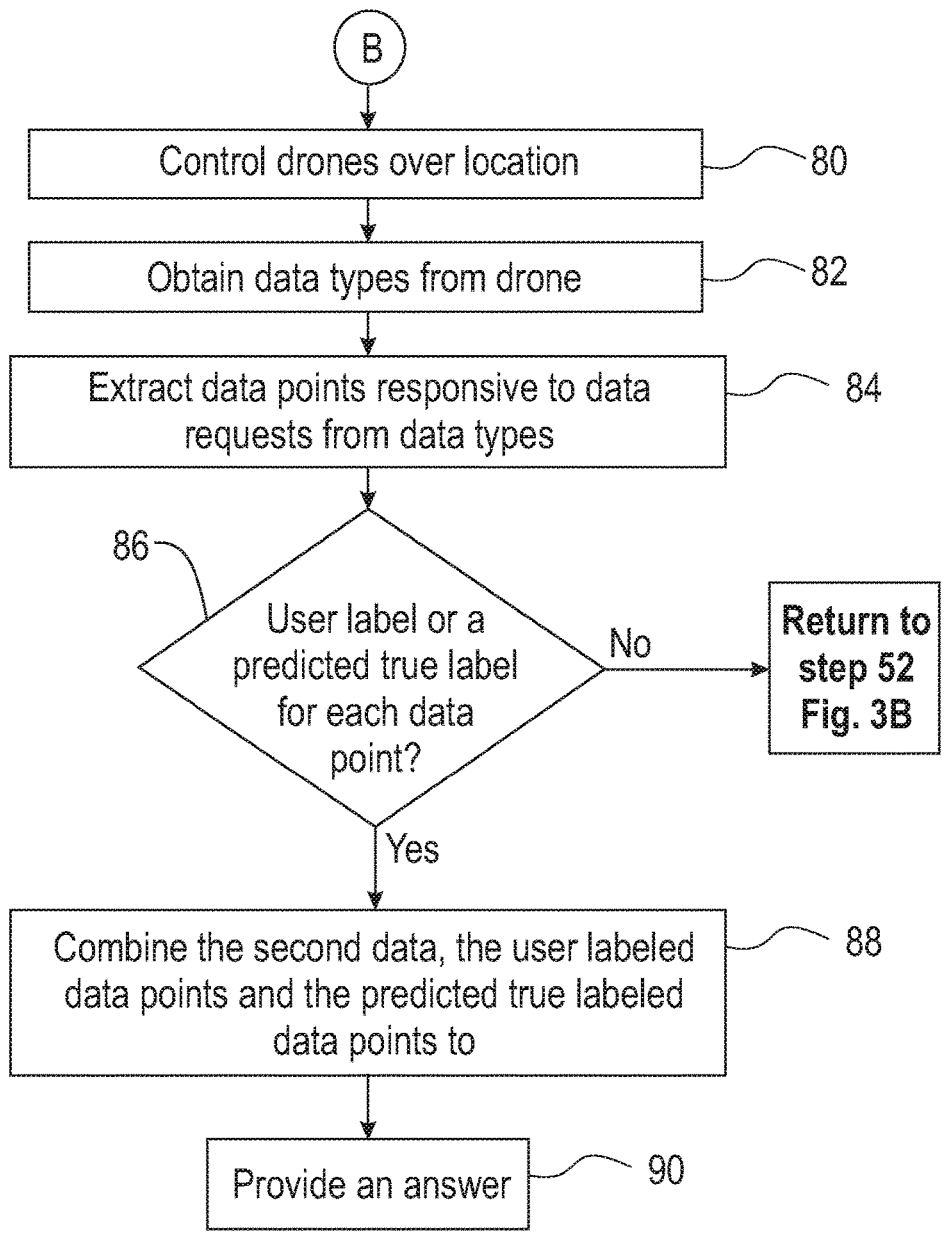
FIG. 4B is a second part of flow chart of another embodiment a method for controlling one or more drones to respond to a request for information using active learning.

As shown in FIG. 4B, step 84 is extracting a plurality of data points responsive to the plurality of data requests from the plurality of data types obtained by the one or more drones. Thereafter, the method moves to determining whether there are user labels or a predicted true labels for each of the plurality of data points. If there are data points without a user label or a true predicted label then the method returns to step 52. If the result of step 8 is Yes, the method moves to step 88 which is combining the second data, the user labeled data points and the predicted true labeled data points to provide an answer to the second natural language request for information at step 90.

The methods described herein can be implemented as part of a system for the management of a fleet Unmanned Aerial Vehicles (UAVs, or "drones"). The system can a set of tasks requested by one or more task requesters, map of each task to one or more drones, based on the requirements of the task and the capabilities of the drones, compute terrain-aware drone flight plans, store the multi-modal data captured by the drone (including flight telemetry logs, visual imagery, IR imagery, and sensor data), provide temporal and geospatial indexing of the drone data for use in analytics applications and provide notifications and visualization of analytics results. One or more commercial, off-the-shelf drones can used, for example, drones manufactured by 3DRobotics (Iris, Iris+, X8, X8-M) and DJI (S1000).

In one embodiment, the method can detect gaps in a spatiotemporal data set by identifying regions in which either no drone data has been collected, or in which the age of the last data collected by a drone in a specified region exceeds some threshold. By identifying these gaps, the method can automatically (or with manual approval) generate requests for this data. E.g., for a given field, the method can detect that the last images collected were ten days ago and that no temperature data has been collected, triggering a request for imagery and temperature data.

Figure 5:
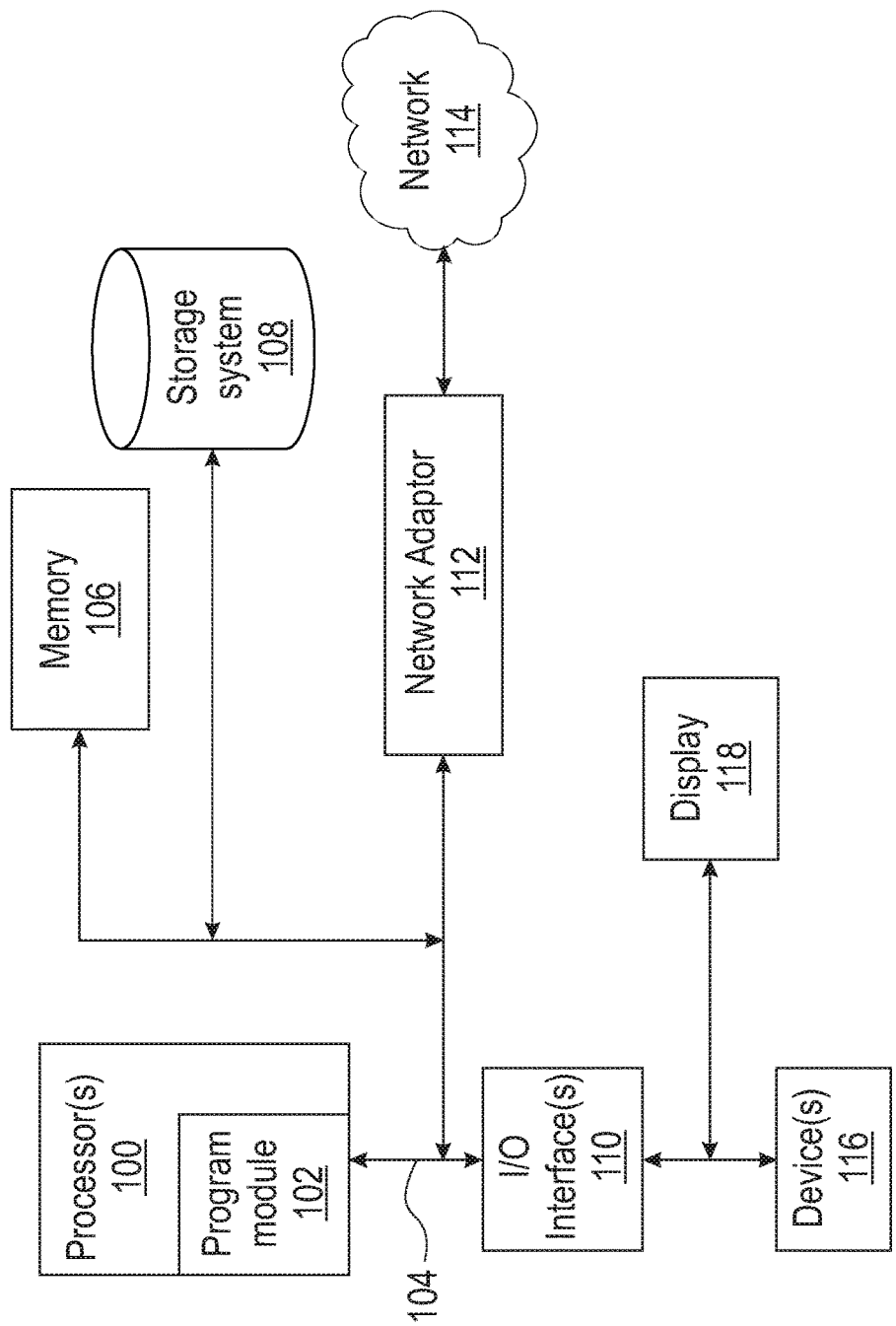
FIG. 5 is a block diagram of an exemplary computing system suitable for implementation of this invention.

FIG. 5 illustrates a schematic of an example computer or processing system that may implement the method for controlling one or more drones to respond to a request for information in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 5 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 100, a system memory 106, and a bus 104 that couples various system components including system memory 106 to processor 100. The processor 100 may include a program module 102 that performs the methods described herein. The module 102 may be programmed into the integrated circuits of the processor 100, or loaded from memory 106, storage device 108, or network 114 or combinations thereof.

Bus 104 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 106 can include computer system readable media in the form of volatile memory, such as random access memory (RAM) and/or cache memory or others. Computer system may further include other removable/non-removable, volatile/non-volatile computer system storage media. By way of example only, storage system 108 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 104 by one or more data media interfaces.

Computer system may also communicate with one or more external devices 116 such as a keyboard, a pointing device, a display 118, etc.; one or more devices that enable a user to interact with computer system; and/or any devices (e.g., network card, modem, etc.) that enable computer system to communicate with one or more other computing devices. Such communication can occur via Input/Output (I/O) interfaces 110.

Still yet, computer system can communicate with one or more networks 114 such as a local area network (LAN), a general wide area network (WAN), and/or a public network (e.g., the Internet) via network adapter 112. As depicted, network adapter 112 communicates with the other components of computer system via bus 104. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a non-transitory computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

In addition, while preferred embodiments of the present invention have been described using specific terms, such description is for illustrative purposes only, and it is to be understood that changes and variations may be made without departing from the spirit or scope of the following claims.

What is claimed is:

1. A method for controlling one or more drones to respond to a request for information, comprising:
receiving a natural language request for information about a spatial location;
parsing the natural language request into a plurality of data requests, each data request of the plurality of data requests corresponding to a portion of data necessary to answer the natural language request;
configuring a flight plan for one or more drones over the spatial location based on the plurality of data requests;
controlling one or more drones to fly over the spatial location according to the configured flight plan to obtain a plurality of data types from the spatial location based on the plurality of data requests, each data type providing a corresponding portion of the data necessary to answer the natural language request;
extracting data responsive to the plurality of data requests from the plurality of data types obtained by the one or more drones; and
analyzing the responsive data to provide an answer to the natural language request for information.

2. The method of claim 1, wherein the data types include one or more of data obtained from an imaging system and data obtained from one or more sensors and wherein the plurality of data requests include one or more of a set of data to be collected, a location from which the data set is to be collected, analytics to be performed on the data set a timeframe to collect the data set.

3. The method of claim 1, further comprising selecting one or more drones based on matching drone capabilities to one or more of the plurality of data requests and uploading flight plans to the one or more drones, receiving real-time telemetry from the drone and performing analytics on the real-time telemetry to determine real-time flight conditions.

4. The method of claim 3, further comprising displaying the real-time telemetry and real-time flight conditions on a user interface (UI) in a mobile application and manually controlling the flight path of the one or more drones from the UI.

5. The method of claim 1, further comprising:
extracting a plurality of data points responsive to the plurality of data requests from the plurality of data types obtained by the one or more drones;
obtaining labels for one or more of the plurality of data points; and
combining the extracted data and the labeled data points to provide an answer to the first natural language request for information.

6. The method of claim 5, further comprising:
obtaining labels from a user for one or more of the plurality of data points;
predicting labels for unlabeled data points from a learning algorithm using the labels obtained from the user;
determining the predicted labels are true labels for the unlabeled data points; and
combining the extracted data, the user labeled data points and the true labeled data points to provide an answer to the first natural language request for information.

7. The method of claim 1, further comprising;
searching for existing sources for the plurality of data requests;
determining that there are one or more existing sources for one or more of the plurality of data requests;
analyzing the existing sources to obtain first data responsive to the plurality of data requests;
determining that there are no existing sources for two or more of the plurality of data requests and identifying the data requests with no existing source as missing data requests;
wherein configuring a flight plan comprises configuring a flight plan for one or more drones over the spatial location based on the missing data requests;
wherein controlling one or more drones comprises controlling one or more drones to fly over the spatial location according to the configured flight plan to obtain a plurality of data types from the spatial location based on the missing data requests;
wherein extracting data comprises extracting a plurality of data points responsive to the plurality of data requests from the plurality of data types obtained by the one or more drones obtaining labels from a user for one or more of the plurality of data points;
determining whether there are unlabeled data points;
predicting labels for the unlabeled data points from a learning algorithm using the labels obtained from the user;
determining the predicted labels are true labels for the unlabeled data points; and
wherein analyzing responsive data comprises combining the first data, the user labeled data points and the true labeled data points to provide an answer to the first natural language request for information.

8. The method of claim 7, wherein the learning algorithm comprises active learning using a support vector machine.

9. The method of claim 8, further comprising:
receiving a second natural language request for information about the spatial location;
parsing the second natural language request into a plurality of second data requests;
searching for existing sources for the plurality of second data requests;

determining that there are one or more existing sources for one or more of the plurality of second data requests;
analyzing the existing sources to obtain second data responsive to the plurality of second data requests;
determining that there are no existing sources for two or more of the plurality of second data requests and identifying the data requests with no existing source as missing data requests;
configuring a flight plan for one or more drones over the spatial location based on the missing data requests;
controlling one or more drones to fly over the spatial location according to the configured flight plan to obtain a plurality of data types from the spatial location based on the missing data requests;
extracting a plurality of data points responsive to the plurality of data requests from the plurality of data types obtained by the one or more drones;
determining that there is a user label or a predicted true label for each of the plurality of data points; and
combining the second data, the user labeled data points and the predicted true labeled data points to provide an answer to the second natural language request for information.

10. A non-transitory article of manufacture tangibly embodying computer readable instructions, which when implemented, cause a computer to perform the steps of a method for controlling one or more drones to respond to a request for information, comprising:
receiving a natural language request for information about a spatial location;
parsing the natural language request into a plurality of data requests, each data request of the plurality of data requests corresponding to a portion of data necessary to answer the natural language request;
configuring a flight plan for one or more drones over the spatial location based on the plurality of data requests;
controlling one or more drones to fly over the spatial location according to the configured flight plan to obtain a plurality of data types from the spatial location based on the plurality of data requests, each data type providing a corresponding portion of the data necessary to answer the natural language request;
extracting data responsive to the plurality of data requests from the plurality of data types obtained by the one or more drones; and
analyzing the responsive data to provide an answer to the natural language request for information.

11. The non-transitory article of manufacture of claim 10, further comprising computer readable instructions, which when implemented, cause a computer to perform the steps of:
extracting a plurality of data points responsive to the plurality of data requests from the plurality of data types obtained by the one or more drones, wherein the data types include one or more of data obtained from an imaging system and data obtained from one or more sensors and wherein the plurality of data requests include one or more of a set of data to be collected, a location from which the data set is to be collected, analytics to be performed on the data set a timeframe to collect the data set;
obtaining labels for one or more of the plurality of data points; and
combining the extracted data and the labeled data points to provide an answer to the first natural language request for information.

12. The non-transitory article of manufacture of claim 11, further comprising computer readable instructions, which when implemented, cause a computer to perform the steps of:
obtaining labels from a user for one or more of the plurality of data points;
predicting labels for unlabeled data points from a learning algorithm using the labels obtained from the user;
determining the predicted labels are true labels for the unlabeled data points; and
combining the extracted data, the user labeled data points and the true labeled data points to provide an answer to the first natural language request for information.

13. The non-transitory article of manufacture of claim 10, further comprising computer readable instructions, which when implemented, cause a computer to perform the steps of:
searching for existing sources for the plurality of data requests;
determining that there are one or more existing sources for one or more of the plurality of data requests;
analyzing the existing sources to obtain first data responsive to the plurality of data requests;
determining that there are no existing sources for two or more of the plurality of data requests and identifying the data requests with no existing source as missing data requests;
wherein configuring a flight plan comprises configuring a flight plan for one or more drones over the spatial location based on the missing data requests;
wherein controlling one or more drones comprises controlling one or more drones to fly over the spatial location according to the configured flight plan to obtain a plurality of data types from the spatial location based on the missing data requests;
wherein extracting data comprises extracting a plurality of data points responsive to the plurality of data requests from the plurality of data types obtained by the one or more drones
obtaining labels from a user for one or more of the plurality of data points;
determining whether there are unlabeled data points;
predicting labels for the unlabeled data points from a learning algorithm using the labels obtained from the user, the learning algorithm comprising active learning using a support vector machine;
determining the predicted labels are true labels for the unlabeled data points; and
wherein analyzing the responsive data comprises combining the first data, the user labeled data points and the true labeled data points to provide an answer to the first natural language request for information.

14. The non-transitory article of manufacture of claim 13, further comprising computer readable instructions, which when implemented, cause a computer to perform the steps of:
receiving a second natural language request for information about the spatial location;
parsing the second natural language request into a plurality of second data requests;
searching for existing sources for the plurality of second data requests;
determining that there are one or more existing sources for one or more of the plurality of second data requests;
analyzing the existing sources to obtain second data responsive to the plurality of second data requests;

determining that there are no existing sources for two or more of the plurality of second data requests and identifying the data requests with no existing source as missing data requests;

configuring a flight plan for one or more drones over the spatial location based on the missing data requests;

controlling one or more drones to fly over the spatial location according to the configured flight plan to obtain a plurality of data types from the spatial location based on the missing data requests;

extracting a plurality of data points responsive to the plurality of data requests from the plurality of data types obtained by the one or more drones;

determining that there is a user label or a predicted true labels for each of the plurality of data points; and combining the existing source obtained data points, the user labeled data points and the predicted true labeled data points to provide an answer to the second natural language request for information.

15. A computer system for controlling one or more drones to respond to a request for information, comprising:

one or more computer processors;

one or more non-transitory computer-readable storage media;

program instructions, stored on the one or more non-transitory computer-readable storage media, which when implemented by the one or more processors, cause the computer system to perform the steps of:

receiving a natural language request for information about a spatial location;

parsing the natural language request into a plurality of data requests, each data request of the plurality of data requests corresponding to a portion of data necessary to answer the natural language request;

configuring a flight plan for one or more drones over the spatial location based on the plurality of data requests;

controlling one or more drones to fly over the spatial location according to the configured flight plan to obtain a plurality of data types from the spatial location based on the plurality of data requests, each data type providing a corresponding portion of the data necessary to answer the natural language request;

extracting data responsive to the plurality of data requests from the plurality of data types obtained by the one or more drones; and analyzing the responsive data to provide an answer to the natural language request for information.

16. The computer system of claim 15, further comprising program instructions which cause the computer system to perform the steps of:

uploading flight plans to the one or more drones;

receiving real-time telemetry from the drone;

performing analytics on the real-time telemetry to determine real-time flight conditions, and displaying the real-time telemetry and real-time flight conditions on a user interface (UI) in a mobile application.

17. The computer system of claim 15, further comprising program instructions which cause the computer system to perform the steps of:

extracting a plurality of data points responsive to the plurality of data requests from the plurality of data types obtained by the one or more drones, wherein the data types include one or more of data obtained from an imaging system and data obtained from one or more sensors and wherein the plurality of data requests include one or more of a set of data to be collected, a location from which the data set is to be collected, analytics to be performed on the data set a timeframe to collect the data set;

obtaining labels for one or more of the plurality of data points; and combining the extracted data and the labeled data points to provide an answer to the first natural language request for information.

18. The computer system of claim 17, further comprising program instructions which cause the computer system to perform the steps of:

obtaining labels from a user for one or more of the plurality of data points;

predicting labels for unlabeled data points from a learning algorithm using the labels obtained from the user;

determining the predicted labels are true labels for the unlabeled data points; and combining the extracted data, the user labeled data points and the true labeled data points to provide an answer to the first natural language request for information.

19. The computer system of claim 15, further comprising program instructions which cause the computer system to perform the steps of:

searching for existing sources for the plurality of data requests;

determining that there are one or more existing sources for one or more of the plurality of data requests;

analyzing the existing sources to obtain first data responsive to the plurality of data requests;

determining that there are no existing sources for two or more of the plurality of data requests and identifying the data requests with no existing source as missing data requests;

wherein configuring a flight plan comprises configuring a flight plan for one or more drones over the spatial location based on the missing data requests;

wherein controlling one or more drones comprises controlling one or more drones to fly over the spatial location according to the configured flight plan to obtain a plurality of data types from the spatial location based on the missing data requests;

wherein extracting data comprises extracting a plurality of data points responsive to the plurality of data requests from the plurality of data types obtained by the one or more drones;

obtaining labels from a user for one or more of the plurality of data points;

determining whether there are unlabeled data points;

predicting labels for the unlabeled data points from a learning algorithm using the labels obtained from the user, the learning algorithm comprising active learning using a support vector machine;

determining the predicted labels are true labels for the unlabeled data points; and wherein analyzing the responsive data comprises combining the first data, the user labeled data points and the true labeled data points to provide an answer to the first natural language request for information.

20. The computer system of claim 19, further comprising program instructions which cause the computer system to perform the steps of:

receiving a second natural language request for information about the spatial location;

parsing the second natural language request into a plurality of second data requests;

searching for existing sources for the plurality of second data requests;

determining that there are one or more existing sources for one or more of the plurality of second data requests;

analyzing the existing sources to obtain second data responsive to the plurality of second data requests;

determining that there are no existing sources for two or more of the plurality of second data requests and identifying the data requests with no existing source as missing data requests;

configuring a flight plan for one or more drones over the spatial location based on the missing data requests;

controlling one or more drones to fly over the spatial location according to the configured flight plan to obtain a plurality of data types from the spatial location based on the missing data requests;

extracting a plurality of data points responsive to the plurality of data requests from the plurality of data types obtained by the one or more drones;

determining that there is a user labels or predicted true label for each of the plurality of data points; and combining the existing source obtained data points, the user labeled data points and the predicted true labeled data points to provide an answer to the second natural language request for information.

* * * * *